(12) United States Patent
Takano et al.

(10) Patent No.: US 6,404,902 B1
(45) Date of Patent: Jun. 11, 2002

(54) IMAGE PROCESSING APPARATUS

(75) Inventors: Misao Takano, Nara; Noboru Kubo, Ikoma; Seido Kawanaka, Yawata; Tomoaki Sumita, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/123,808

(22) Filed: Jul. 28, 1998

(30) Foreign Application Priority Data

Jul. 28, 1997  (JP) ............................................. 9-201940

(51) Int. Cl.[7] ................................................. G06K 9/00
(52) U.S. Cl. ....................................... 382/104; 382/105
(58) Field of Search ........................... 345/435; 348/48; 358/450; 382/105, 104, 284

(56) References Cited

U.S. PATENT DOCUMENTS

| 4,878,248 A | * | 10/1989 | Shyu et al. ..................... 382/9 |
| 5,144,693 A | * | 9/1992 | Morgan ....................... 395/158 |
| 5,412,767 A | * | 5/1995 | Long ........................... 395/133 |
| 5,818,399 A | * | 10/1998 | Omori et al. .................. 345/8 |
| 5,976,071 A | * | 11/1999 | Sekiya ......................... 600/111 |
| 6,043,824 A | * | 3/2000 | Bier ............................ 345/435 |

FOREIGN PATENT DOCUMENTS

| JP | 7-105352 A | 4/1995 | ............. G06K/1/00 |
| JP | 7146916 | 6/1995 | ............. G06K/9/62 |

* cited by examiner

Primary Examiner—Leo Boudreau
Assistant Examiner—Barry Choobin

(57) ABSTRACT

An image processing apparatus includes a plurality of imaging devices located at respective prescribed positions; at least one optical device for receiving light and projecting an image of the received light to the imaging devices; and an image processing section for processing respective images obtained by the imaging devices, wherein the imaging devices and the optical section form a single unit.

15 Claims, 14 Drawing Sheets

Image of first CCD 21

Image of second CCD 22

Image of first CCD 21

Image of second CCD 22

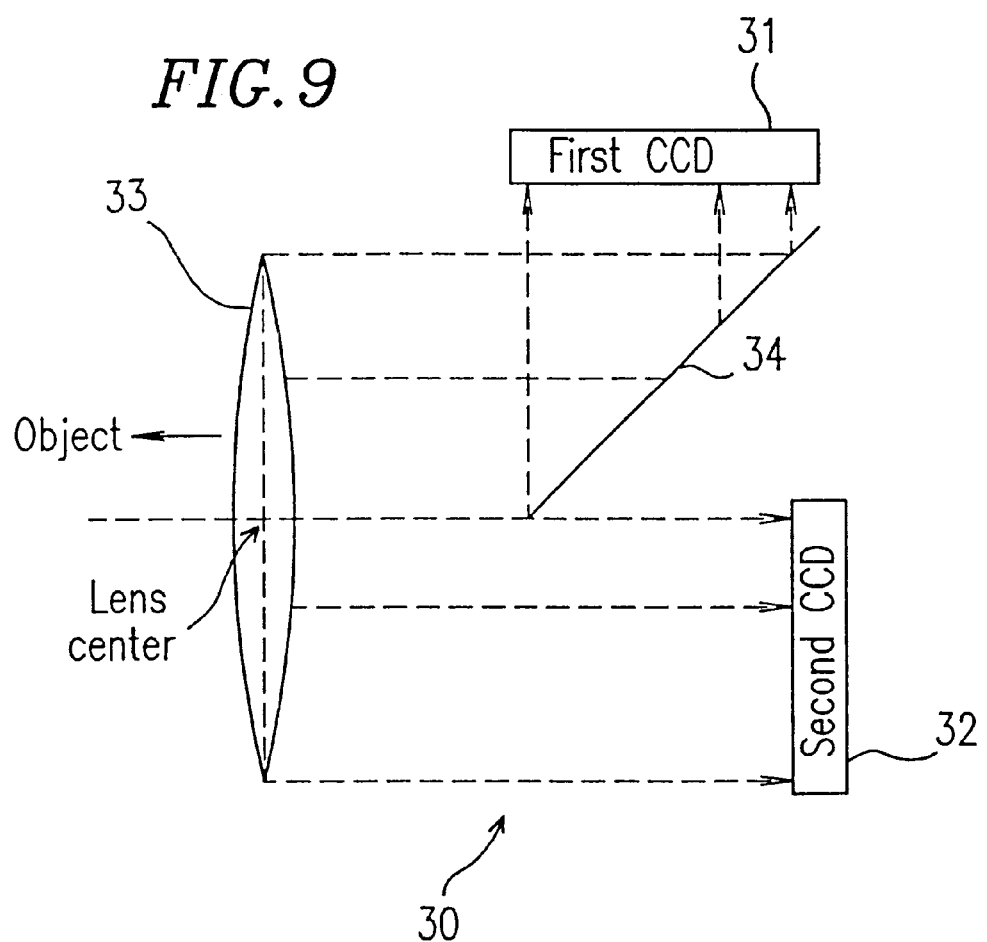

Image of first CCD 31

Image of second CCD 32

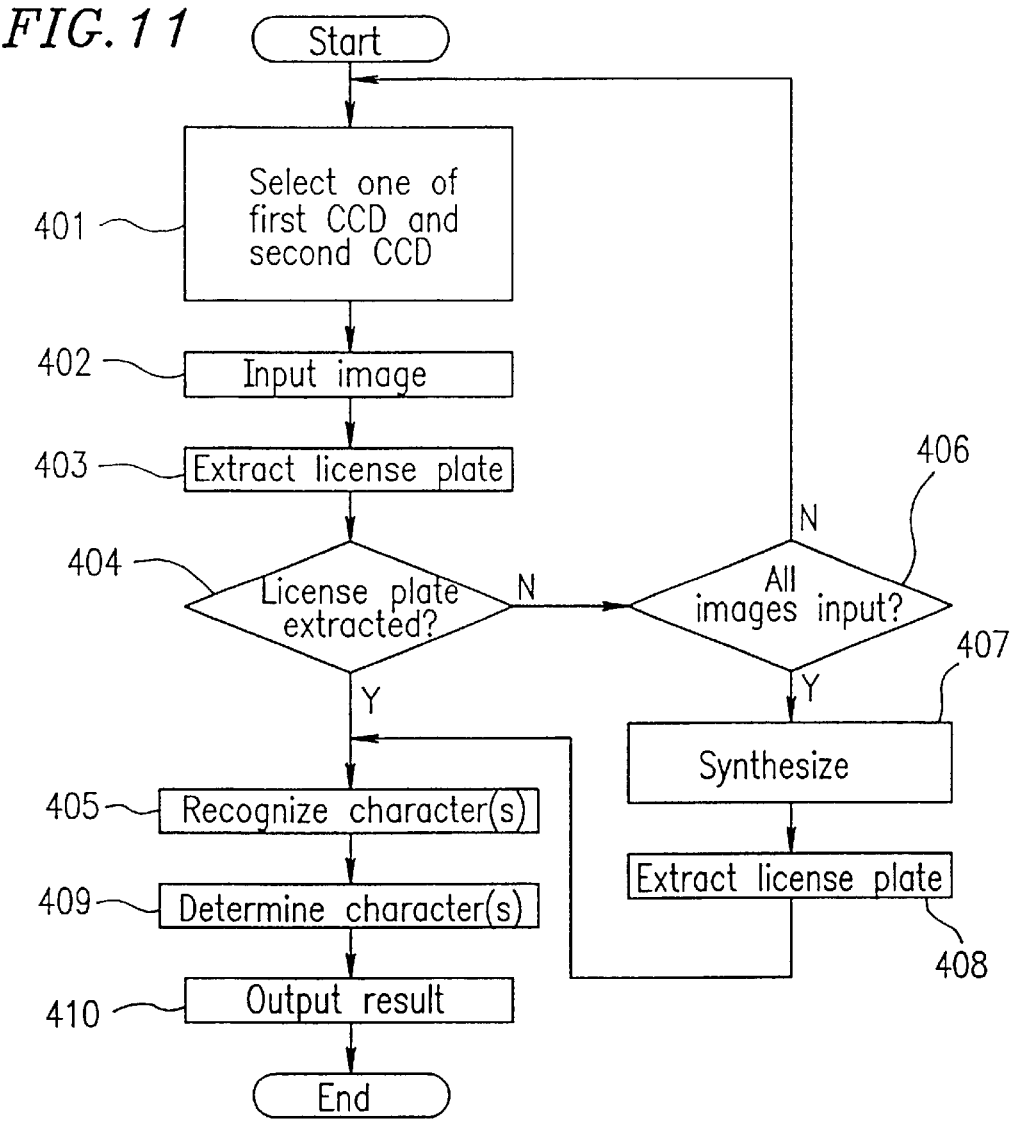

IMAGE PROCESSING APPARATUS

BACKGROUND OF THE INVENTION

1. Field of the Invention

The present invention relates to an image processing apparatus for imaging and recognizing an object.

2. Description of the Related Art

This type of image processing apparatus includes an image processing apparatus for recognizing a character(s) on a license plate of a vehicle such as an automobile. This image processing apparatus is referred to as a number recognition system.

For example, the number recognition system has such a structure as shown in FIG. 15, and operates according to the flow chart of FIG. 16. In this system, a single video camera 102 images a license plate 101 of, for example, an automobile stopped at a prescribed position (Step 111), and an image processing section 103 receives the resultant image to extract an image of the license plate 101 therefrom (Step 112). A determining section 104 recognizes and determines a character(s) on the extracted license plate 101 (Steps 113 and 114, respectively). Thereafter, the determined character(s) is displayed for output (Steps 115 and 116).

According to this system, it is not necessary to image the entire automobile as long as the license plate is imaged. Therefore, a stop position of the automobile with respect to the video camera is specified so that the license plate is included in the imaging field of view of the video camera.

In order to cause the automobile to be stopped at the specified stop position, it is necessary to indicate the stop position and lead the automobile thereto. In terms of simple and inexpensive construction, the stop position is clearly painted on the road so that the driver of the automobile recognizes the stop position and stops the automobile at the stop position.

In this method, however, whether or not the automobile is stopped exactly at the stop position depends on the driver's skill. Therefore, the number recognition system must have a sufficiently large imaging range for a license plate. In the case where a small imaging range for a license plate is set, the license plate would not be imaged if the automobile is stopped at a position away from the specified stop position. Therefore, the number recognition system does not perform its proper function.

According to the number recognition system, the stop position of the automobile must be limited in some way. In many cases, the license plate is imaged by a single video camera, making the imaging range for the license plate extremely small. Therefore, the margin for error in an actual stop position of the automobile is small.

Moreover, automobiles of different types have different sizes, and different license plate positions. Accordingly, even if the automobile can be stopped at the specified position, the position of the license plate can not always be accurately determined. As a result, the imaging range of the video camera must be carefully determined.

For the system user, it is preferable that the stop position of the automobile is less critical. In other words, it is more convenient for the system user to stop the automobile at an arbitrary position. Therefore, the conventional number recognition system is less preferable.

Furthermore, it is preferable for the system to have a large imaging range of the video camera in terms of the degree of freedom in system design and installation.

As described above, in the case where the license plate is imaged by a single video camera, the imaging range for the license plate is very small. Therefore, the stop position of the automobile is limited and the degree of freedom in system design and installation is reduced, making the system less advantageous.

A high-resolution video camera having a large imaging range has been proposed to ensure character recognition on the license plate with a less-limited stop position of the automobile. Moreover, Japanese Laid-open Publication No. 7-105352 describes an "image processing apparatus" including two video cameras having different imaging ranges, wherein the respective images obtained by the video cameras are processed.

However, the high-resolution video camera having a large field of view is expensive. Furthermore, a large amount of data is produced in order to obtain an image, increasing the image processing time, and thus, the extraction time of the license plate. Moreover, in the case where a larger field of view is required, a higher-resolution imaging device is required, thereby further increasing the image processing time.

Moreover, in the case where two video cameras having respective imaging ranges are used as described in Japanese Laid-open Publication No. 7-105352, the imaging ranges must be adjusted upon system installation so that the imaging ranges are adjacent to each other. Such adjustment is largely affected by the conditions of the installation location and the skill of a person who installs the system, causing a divergence of the system reliability and an increase in the processing steps. Furthermore, since the relative positions of the imaging ranges of the video cameras are changed according to the installation conditions, a software for processing the images obtained by the video cameras must be adjusted according to the installation conditions.

SUMMARY OF THE INVENTION

According to one aspect of the present invention, an image processing apparatus includes a plurality of imaging devices located at respective prescribed positions; at least one optical device for receiving light and projecting an image of the received light to the imaging devices; and an image processing section for processing respective images obtained by the imaging devices, wherein the imaging devices and the optical section form a single unit.

In one example, the optical device is a single element, and projects an entire image to imaging screens of the plurality of imaging devices.

In one example, an image processing apparatus further includes a semi-transparent mirror for dividing light from the optical device into a plurality of portions to assign respective images of the divided portions of light to the respective imaging devices.

In one example, an image processing apparatus further includes a detecting section for detecting a position of an object, wherein the image processing section selects one of the respective images obtained by the imaging devices, based on the detected position of the object, and processes the selected image.

In one example, the image processing section extracts the object from the selected image.

In one example, the image processing section synthesizes at least two of the respective images obtained by the imaging devices into a single image having no overlapping portion.

In one example, the image processing section extracts the object from the single image resulting from synthesizing at least two of the respective images obtained by the imaging devices.

According to the present invention, since the imaging devices and the optical device(s) form a single unit, the relative positions of the imaging ranges of the imaging devices are specified. Therefore, the respective imaging ranges of the imaging devices need not be adjusted upon installation of the image processing apparatus, whereby the image processing apparatus can be easily installed with increased reliability. Moreover, since the relative positions of the imaging ranges of the imaging devices are specified, the process conducted by the image processing section can be determined in advance. Therefore, an image processing software need not be adjusted upon installation of the image processing apparatus. It should be understood that a large imaging range can be ensured by pre-setting the imaging ranges of the plurality of imaging devices as appropriate.

By detecting the object position, and selecting one of the respective images obtained by the imaging devices according to the detected object position, the image of the imaging device capturing the object can be selected with a high probability. As a result, the image including the object can be quickly processed.

Thus, the invention described herein makes possible the advantage of providing an image processing apparatus having a large imaging range, capable of being easily installed without degrading its operation capability and reliability, and also capable of reducing the cost.

This and other advantages of the present invention will become apparent to those skilled in the art upon reading and understanding the following detailed description with reference to the accompanying figures.

BRIEF DESCRIPTION OF THE DRAWINGS

FIG. 9 is a block diagram of an imaging section of an image processing apparatus according to Example 2 of the present invention;

FIG. 11 is a flow chart illustrating a procedure conducted by the image processing apparatus of Example 2;

DESCRIPTION OF THE PREFERRED EMBODIMENTS

Figure 1:
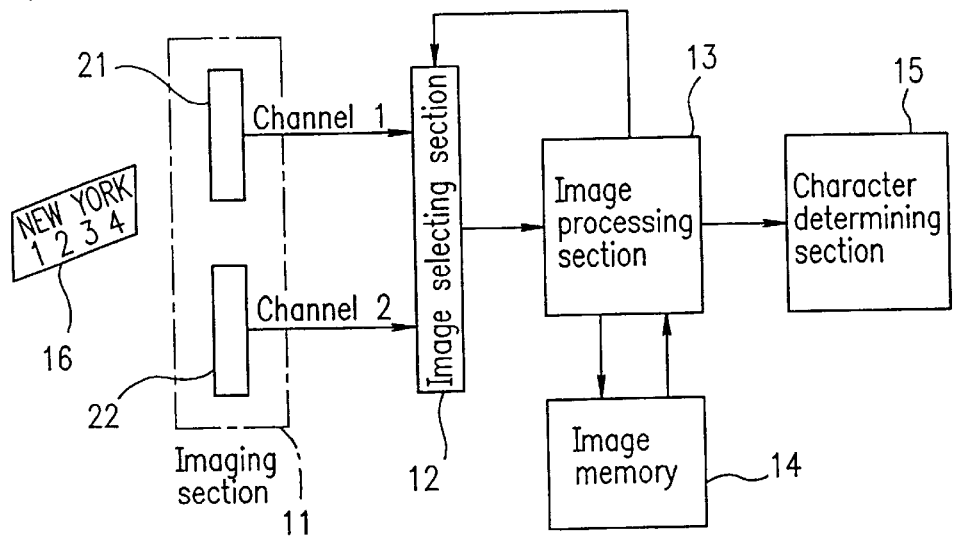
FIG. 1 is a block diagram of an image processing apparatus according to Example 1 of the present invention.

Hereinafter, the present invention will be described by way of illustrative examples with reference to the accompanying drawings. The same reference numerals designate the same components.

(EXAMPLE 1)

FIG. 1 is a block diagram of an image processing apparatus according to Example 1 of the present invention. The image processing apparatus is used as a number recognition system for recognizing a character(s) on a license plate of a vehicle such as an automobile.

The image processing apparatus includes an imaging section 11, an image selecting section 12, an image processing section 13, an image memory 14 and a character determining section 15.

Figure 2:
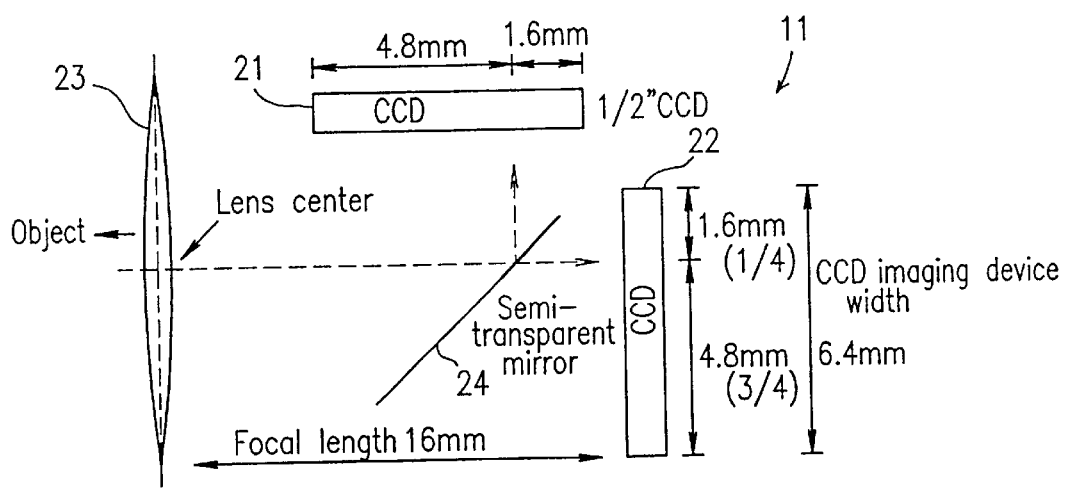
FIG. 2 is a block diagram of an imaging section of the image processing apparatus shown in FIG. 1.

As shown in FIG. 2, the imaging section 11 is constituted by a single unit including a first charge coupled device (CCD) 21, a second CCD 22, an imaging lens 23 and a semi-transparent mirror 24. Light having passed through the imaging lens 23 is directed to the semi-transparent mirror 24. The semi-transparent mirror 24 partially reflects the received light into the first CCD 21, while passing the remaining light therethrough into the second CCD 22. Thus, the light reflected by the semi-transparent mirror 24 is projected onto an imaging screen of the first CCD 21, whereby an image of the projected light is obtained by the first CCD 21. On the other hand, the light having passed through the semi-transparent mirror 24 is projected onto an imaging screen of the second CCD 22, whereby an image of the projected light is obtained by the second CCD 22.

Figure 3A:
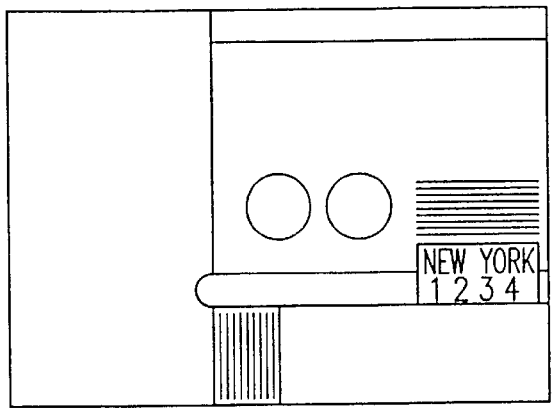
FIG. 3A is a diagram of an image obtained by a first CCD of the imaging section shown in FIG. 2.
Figure 3B:
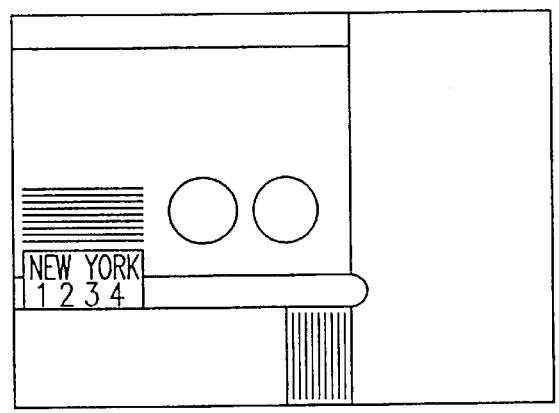
FIG. 3B is a diagram of an image obtained by a second CCD of the imaging section shown in FIG. 2.
Figure 3C:
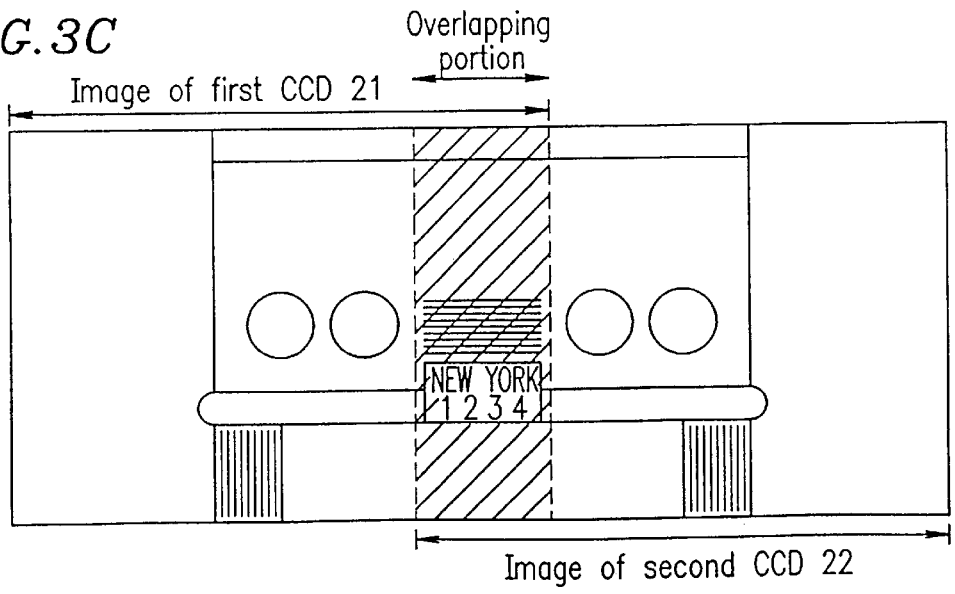
FIG. 3C is a diagram of an image obtained by synthesizing the images shown in FIGS. 3A and 3B.

The positions of the first and second CCDs 21 and 22 are adjusted in advance so that the respective images obtained by the first and second CCDs 21 and 22 partially overlap each other. Thus, the image obtained by the first CCD 21 is as shown in FIG. 3A, whereas the image obtained by the second CCD 22 is as shown in FIG. 3B. If these two images are synthesized, such an image as shown in FIG. 3C is obtained. Accordingly, in the case where at least one of the two images obtained by the first and second CCDs 21 and 22 includes the whole license plate 16, the overlapping portion of the images must have a width larger than that of the license plate 16 projected on the imaging screen(s).

Assuming that each of the first and second CCDs 21 and 22 have a size of 6.4×6.4 mm and the respective imaging screens of the first and second CCDs 21 and 22 horizontally overlap each other by ¼ of the width, that is, by 1.6 mm, the license plate 16 having a width of 395 mm must be included in the overlapping portion having the width of 1.6 mm when projected onto the imaging screen(s). In this case, the distance L from the imaging lens 23 to the license plate 16 is (395×16)/1.6=3950 mm, that is, about 4 m. Provided that the width of the license plate 16 is denoted by d, the distance L is (d×16)/1.6. It should be noted that 16 in this expression is a value of the focal length of the imaging lens 23.

Accordingly, when this image processing apparatus is used as a number recognition system, the distance L between the imaging lens 23 of the imaging section 11 and the license plate 16 of a vehicle such as an automobile must be set to about 4 m. In order to set the distance L to about 4 m, a stop position to which the automobile is led is painted on the road, and the imaging section 11 is located and fixed at such a position that the distance from the license plate 16 to the imaging lens 23 of the imaging section 11 is about 4 m when the automobile is stopped at the stop position. Furthermore, the imaging direction of the imaging section 11 is determined in advance so that a standard license plate 16 would be located substantially in the center of the imaging range of the imaging section 11.

Figure 4A:
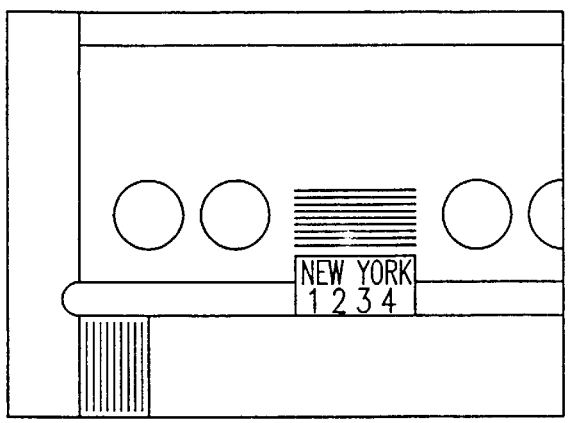
FIG. 4A is a diagram of another image obtained by the first CCD of the imaging section shown in FIG. 2.
Figure 4B:
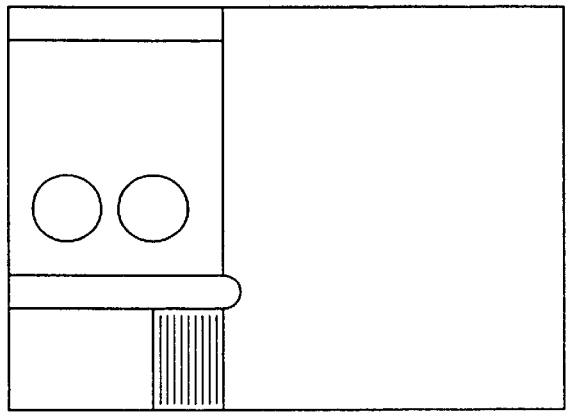
FIG. 4B is a diagram of another image obtained by the second CCD of the imaging section shown in FIG. 2.
Figure 4C:
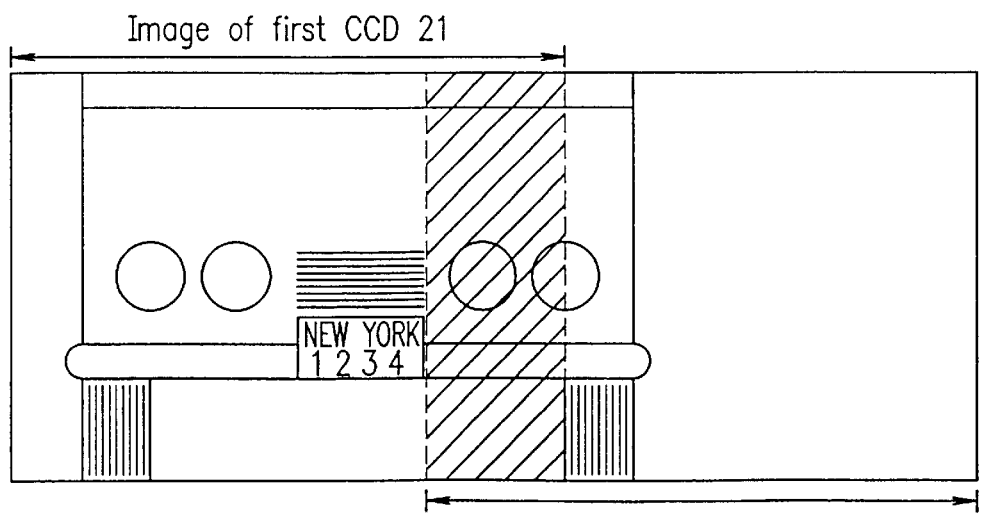
FIG. 4C is a diagram of another image obtained by synthesizing the images shown in FIGS. 4A and 4B.

It should be noted that the image processing apparatus of Example 1 separately processes the image of the first CCD 21 and the image of the second CCD 22, and therefore, does not synthesize these images into the image as shown in FIG. 3C. FIGS. 4A, 4B and 4C show the case where the license plate 16 is included only in the image of the first CCD 21.

Figure 5:
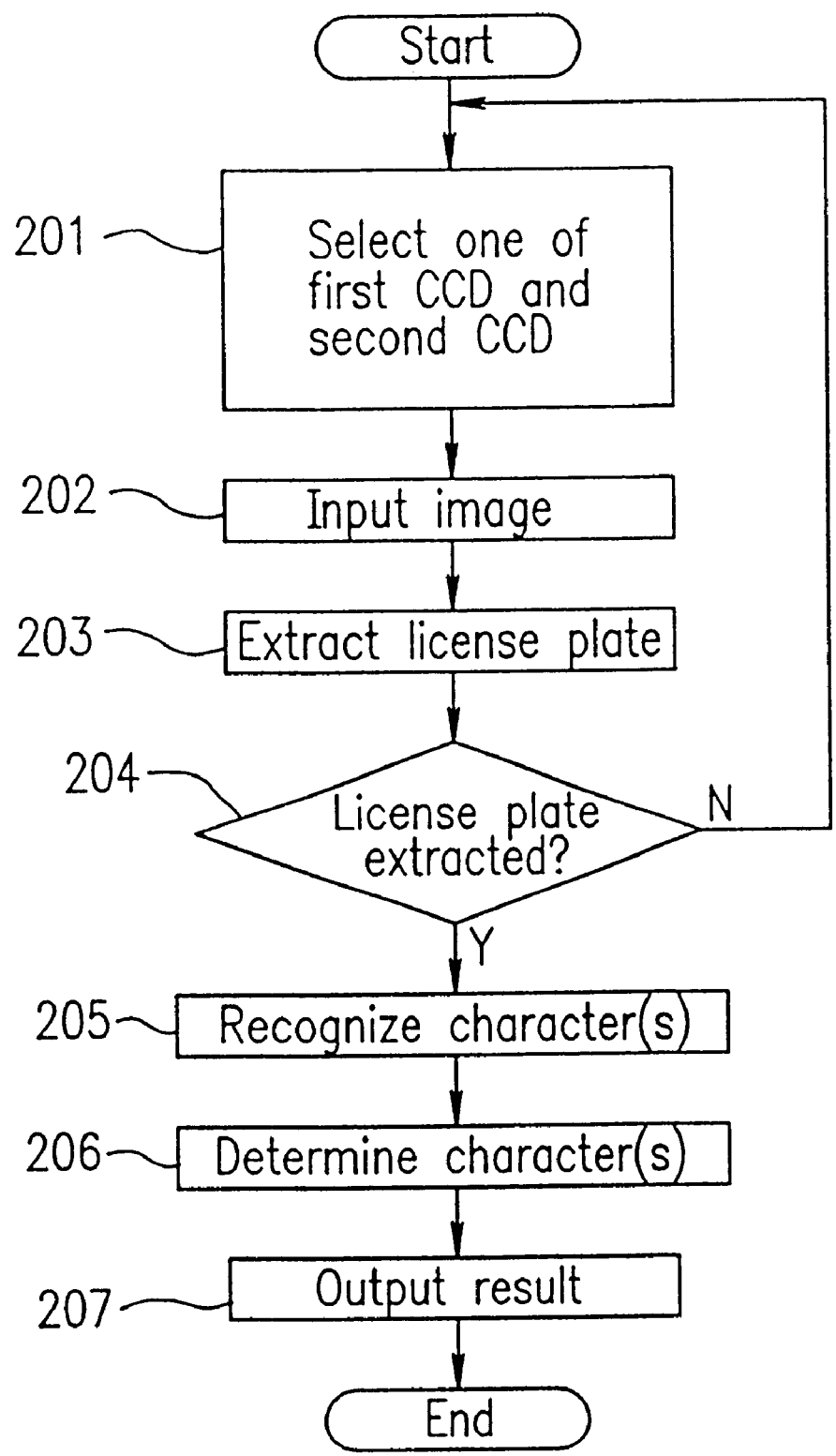
FIG. 5 is a flow chart illustrating a procedure conducted by the image processing apparatus shown in FIG. 1.

The image processing apparatus having such a structure as described above operates according to the flow chart of FIG. 5.

First, when the automobile is stopped at the prescribed stop position, the image selecting section 12 selects one of the first and second CCDs 21 and 22, and provides image data received from the selected CCD to the image processing section 13 (Step 201). The image processing section 13 receives the image data of the CCD and temporarily stores the image data in the image memory 14 (Step 202). Then, the image processing section 13 attempts to extract an image of the license plate 16 from the image represented by the image data (Step 203). In the case where the image of the license plate 16 can be extracted (Step 204, Yes), the process proceeds to Step 205. Otherwise (Step 204, No), the process returns to Step 201. In Step 201, the image selecting section 12 selects the other CCD, that is, the CCD which has not been previously selected, and provides image data of the selected CCD to the image processing section 13. The image processing section 13 receives the image data of the selected CCD and temporarily stores the image data in the image memory 14 (Step 202), and extracts the image of the license plate 16 from the image represented by the received image data (Steps 203 and 204). Then, the process proceeds to Step 205.

The image of the license plate 16 thus extracted is provided to the character determining section 15. The character determining section 15 recognizes and determines a character(s) on the license plate 16 (Steps 205 and 206). Then, the determined character(s) is displayed on, for example, a display device (not shown) (Step 207).

Since imaging is conducted by the first and second CCDs 21 and 22, a larger imaging range can be set. Therefore, a margin for error in an actual stop position of the automobile is increased. Moreover, the imaging section 11 is constituted by a single unit including the first CCD 21, the second CCD 22, the imaging lens 23 and the semi-transparent mirror 24, eliminating the need to adjust the directions of the first and second CCDs 21 and 22. Therefore, the image processing apparatus can be easily installed without taking the conditions of the installation location, the skill of a person who installs the image processing apparatus, or the like into consideration. As a result, a divergence of the system reliability and an increase in the processing steps can be prevented. Moreover, since the relative positions of the imaging ranges of the first and second CCDs 21 and 22 are not changed, an image processing software used in the image processing section 13 need not be adjusted.

The image of the license plate 16 may be included in the overlapping portion of the images of the first and second CCDs 21 and 22. In such a case, no matter which CCD is selected in Step 201, the image of the license plate 16 can be extracted from the image of the selected CCD. However, in the case where the image of the license plate 16 is included only in one of the images of the first and second CCDs 21 and 22, the image of the license plate 16 might not be included in the image of the initially selected CCD. In this case, the process from Steps 201 to 204 is repeated twice, increasing the processing time.

Accordingly, which one of the first and second CCDs 21 and 22 images the license plate 16 is estimated, and one of the first and second CCDs 21 and 22 is selected based on that estimation, whereby the image of the license plate 16 can be quickly extracted.

Figure 6:
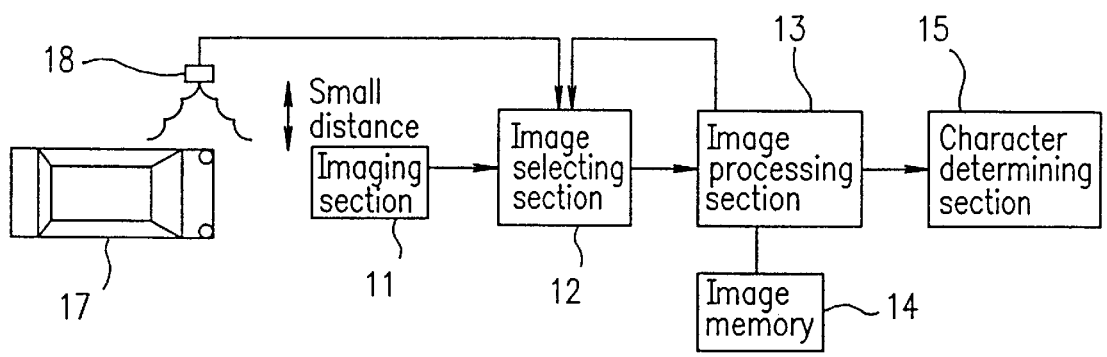
FIG. 6 is a block diagram of a modification of the image processing apparatus shown in FIG. 1.
Figure 7:
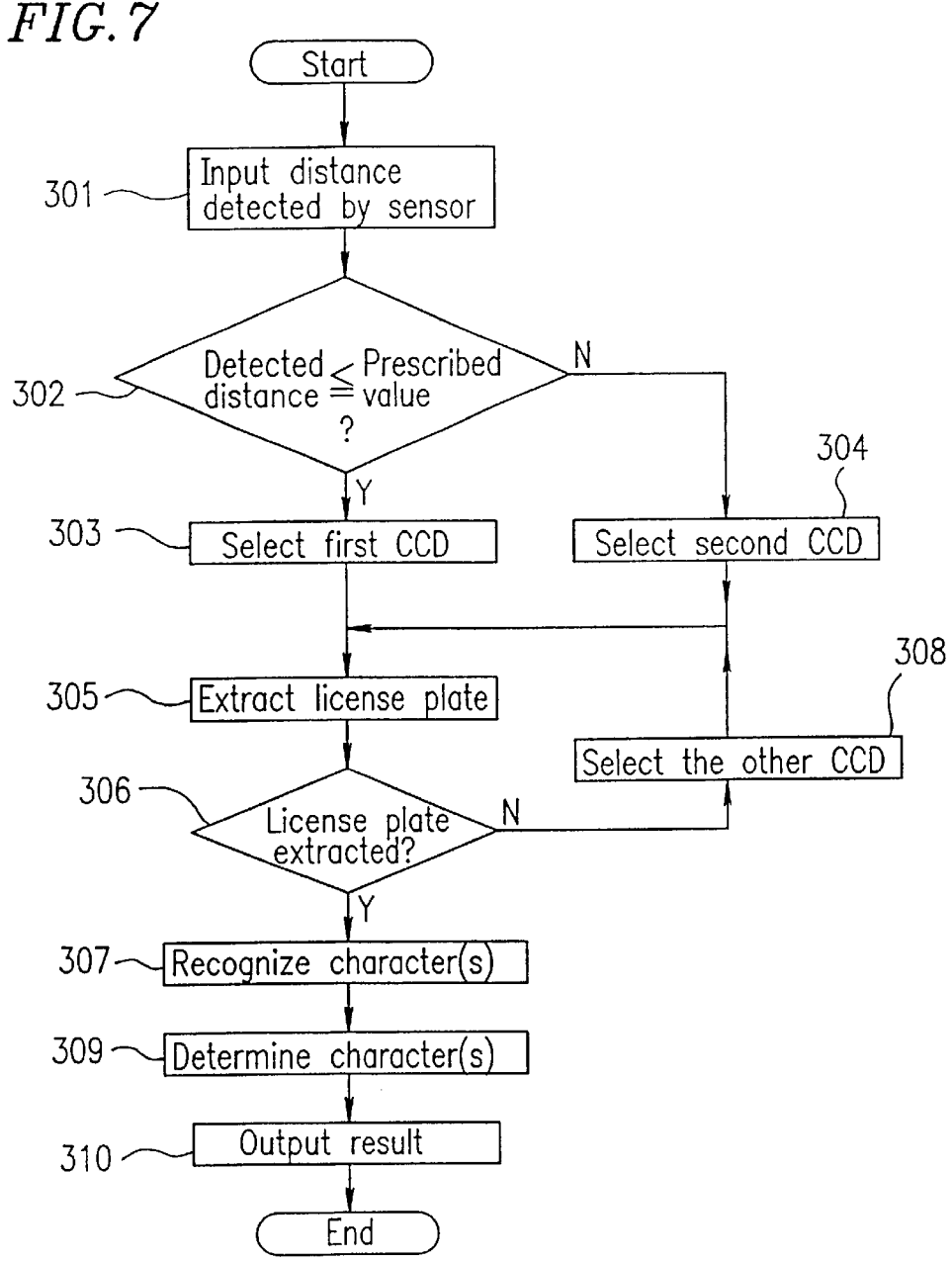
FIG. 7 is a flow chart illustrating a procedure conducted by the image processing apparatus shown in FIG. 6.

FIG. 6 shows a modification of the image processing apparatus in FIG. 1, and FIG. 7 is a flow chart illustrating an image processing procedure of the image processing apparatus in FIG. 6.

Figure 8:
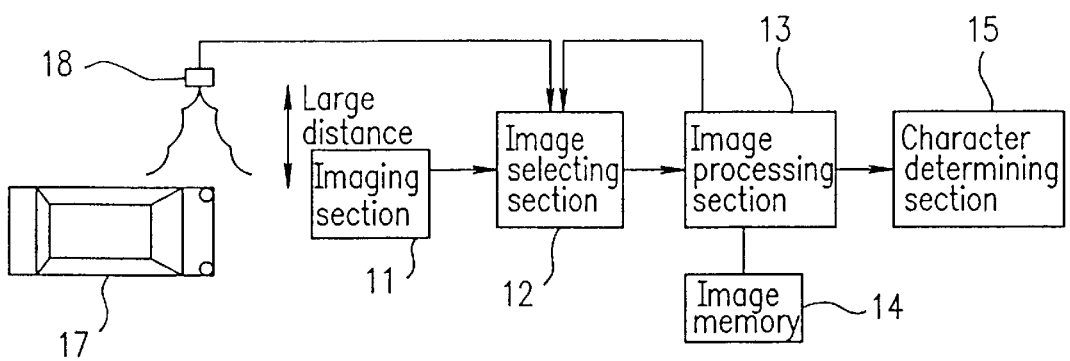
FIG. 8 is a diagram illustrating a function of the image processing apparatus shown in FIG. 6.

According to the image processing apparatus in FIG. 6, a distance sensor 18 is located near the stop position of an automobile 17. The distance sensor 18 detects the distance between the automobile 17 and the distance sensor 18, and provides the detection output to the image selecting section 12 (Step 301). In the case where the distance between the automobile 17 and the distance sensor 18 is equal to or smaller than a prescribed value as shown in FIG. 6, the license plate 16 of the automobile 17 is imaged by the first CCD 21. In the case where the distance between the automobile 17 and the distance sensor 18 is larger than the prescribed value as shown in FIG. 8, the license plate 16 of the automobile 17 is imaged by the second CCD 22.

The image selecting section 12 compares the detected distance between the automobile and the distance sensor 18 with the prescribed value in Step 302.

In the case where the distance between the automobile 17 and the distance sensor 18 is equal to or smaller than the prescribed value (Step 302, Yes), the process proceeds to Step 303. In Step 303, the first CCD 21 is selected, and image data of the first CCD 21 is provided to the image processing section 13.

In the case where the distance between the automobile 17 and the distance sensor 18 is larger than the prescribed value (Step 302, No), the process proceeds to Step 304. In Step 304, the second CCD 22 is selected, and image data of the second CCD 22 is provided to the image processing section 13.

In Step 305, the image processing section 13 receives the image data of the selected CCD, and attempts to extract an image of the license plate 16 from the image represented by the received image data.

In the case where the image processing section 13 can extract the image of the license plate 16 (Step 306, Yes), the process proceeds to Step 307. Otherwise (Step 306, No), the process proceeds to Step 308. In Step 308, the other CCD (not shown), that is, the CCD which has not been previously selected in Step 303 or 304, is selected, and image data of the selected CCD is provided to the image processing section 13. Then, in Step 305, the image of the license plate 16 is extracted from the image represented by the image data.

When the image of the license plate 16 is extracted, the extracted image of the license plate 16 is provided to the character determining section 15. The character determining section 15 recognizes and determines a character(s) on the license plate 16 (Steps 307 and 309). Then, the determined character(s) of the license plate 16 is displayed on, for example, a display device (not shown) (Step 310).

Since one of the images of the first and second CCDs 21 and 22 is selected based on the detected position of the automobile 17, one of the CCDs which Images the license plate 16 can be selected with a high probability. As a result, the processing time will not be wasted.

(EXAMPLE 2)

FIG. 9 shows an imaging section 30 of an image processing apparatus according to Example 2 of the present invention. The image processing apparatus of Example 2 uses the imaging section 30 instead of the imaging section 11 of the image processing apparatus in FIG. 1. The structure of the image processing apparatus of Example 2 is the same as that of the image processing apparatus in FIG. 1 except for the imaging section 30.

Figure 10A:
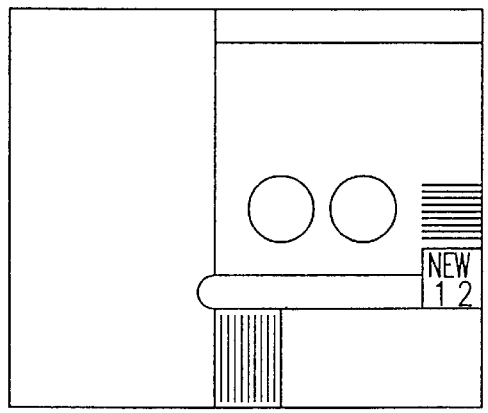
FIG. 10A is a diagram of an image obtained by a first CCD of the imaging section shown in FIG. 9.
Figure 10B:
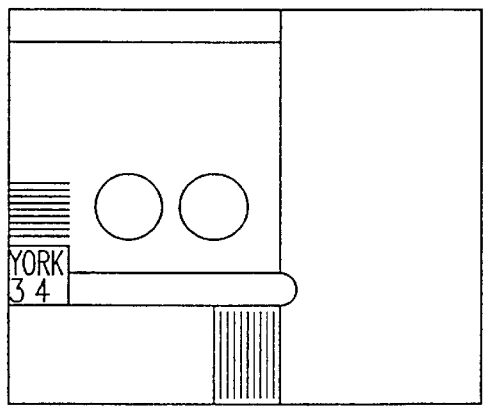
FIG. 10B is a diagram of an image obtained by a second CCD of the imaging section shown in FIG. 9.
Figure 10C:
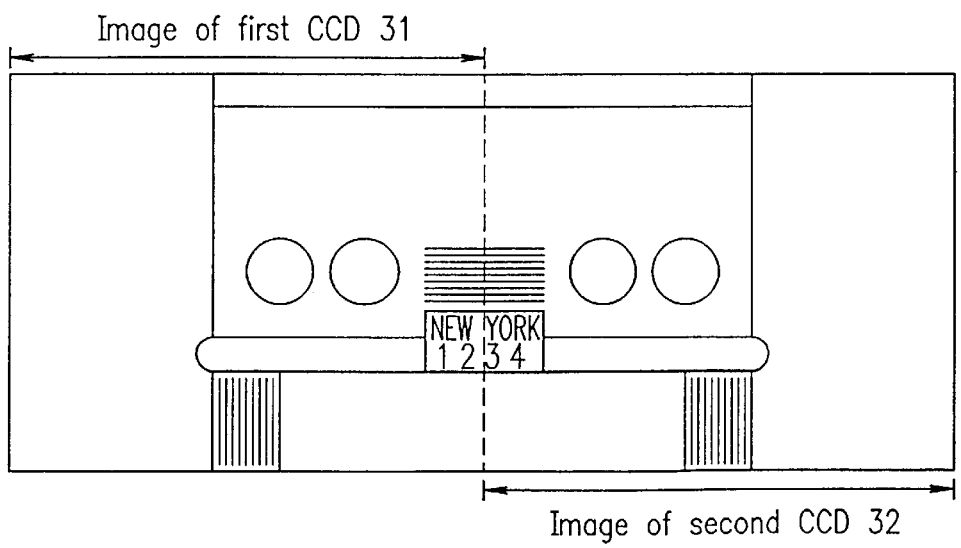
FIG. 10C is a diagram of an image obtained by synthesizing the images shown in FIGS. 10A and 10B.

The imaging section 30 includes a first CCD 31, a second CCD 32, an imaging lens 33 and a semi-transparent mirror 34 in a similar manner to that of the imaging section 11 in FIGS. 1 and 2. However, the positions of the first CCD 31, the second CCD 32 and the semi-transparent mirror 34 are adjusted in advance so that a side of an image obtained by the first CCD 31 is in contact with a side of an image obtained by the second CCD 32. For example, the image obtained by the first CCD 31 is as shown in FIG. 10A, and the image obtained by the second CCD 32 is as shown in FIG. 10B. When the two images are synthesized, such an image as shown in FIG. 10C is obtained.

Accordingly, the entire imaging range of the first and second CCDs 31 and 32 is larger than that of the first and second CCDs 21 and 22 of the imaging section 11 of FIG. 1. However, an image of the license plate 16 is not always included only in one of the two images obtained by the first and second CCDs 31 and 32. In other words, the image of the license plate 16 may be divided into the two images of the first and second CCDs 31 and 32 as shown in FIG. 10C. In this case, the image of the license plate 16 must be extracted from both images of the first and second CCDs 31 and 32.

The image processing apparatus having such a structure described above operates according to the flow chart of FIG. 11.

First, when an automobile is stopped at a prescribed stop position, the image selecting section 12 selects one of the first and second CCDs 31 and 32, and provides image data received from the selected CCD to the image processing section 13 (Step 401). The image processing section 13 receives the image data of the selected CCD, and temporarily stores the received image data in the image memory 14 (Step 402). Then, the image processing section 13 attempts to extract the image of the license plate 16 from the image represented by the received image data (Step 403). If the whole image of the license plate 16 can be extracted (Step 404, Yes), the process proceeds to Step 405. Otherwise (Step 404, No), the process proceeds to Step 406.

In Step 406, whether or not both images of the first and second CCDs 31 and 32 have been input is determined. In the case where the both images of the first and second CCDs 31 and 32 have been input to the image processing section 13 and/or the image memory 14 (Step 406, Yes), the process proceeds to Step 407. Otherwise (Step 406, No), the process returns to Step 401. In Step 401, the other CCD, that is, the CCD which has not been previously selected, is selected. Then, the image data of the selected CCD is provided to the image processing section 13 (Step 402), and the image processing section 13 attempts to extract the image of the license plate 16 from the image represented by the received image data (Step 403).

In the case where the whole image of the license plate 16 can be extracted from the image (Step 404, Yes), the process proceeds to Step 405.

As described above, whether or not both images of the first and second CCDs 31 and 32 have been input to the image processing section 13 and/or the image memory 14 is determined in Step 406. In the case where the both images of the first and second CCDs 31 and 32 have been input (Step 406, Yes), the process proceeds to Step 407.

In Step 407, the images of the first and second CCDs 31 and 32 are synthesized into a large complete image which is smooth and seamless. In Step 408, the whole image of the license plate 16 is extracted from the large image.

The extracted image of the license plate 16 is provided to the character determining section 15. The character determining section 15 recognizes and determines a character(s) on the license plate 16 (Steps 405 and 409). Then, the determined character(s) is displayed on, for example, a display device (not shown) (Step 410).

In the case where the image of the license plate 16 stretches over the two images of the first and second CCDs 31 and 32, that is, in the case where a part of the image of the license plate 16 is included in the image of the first CCD 31 and the other part thereof is included in the image of the second CCD 32, the images of the first and second CCDs 31 and 32 are synthesized into a single large image. Therefore, the image of the license plate 16 can be extracted from the large image.

Figure 12:
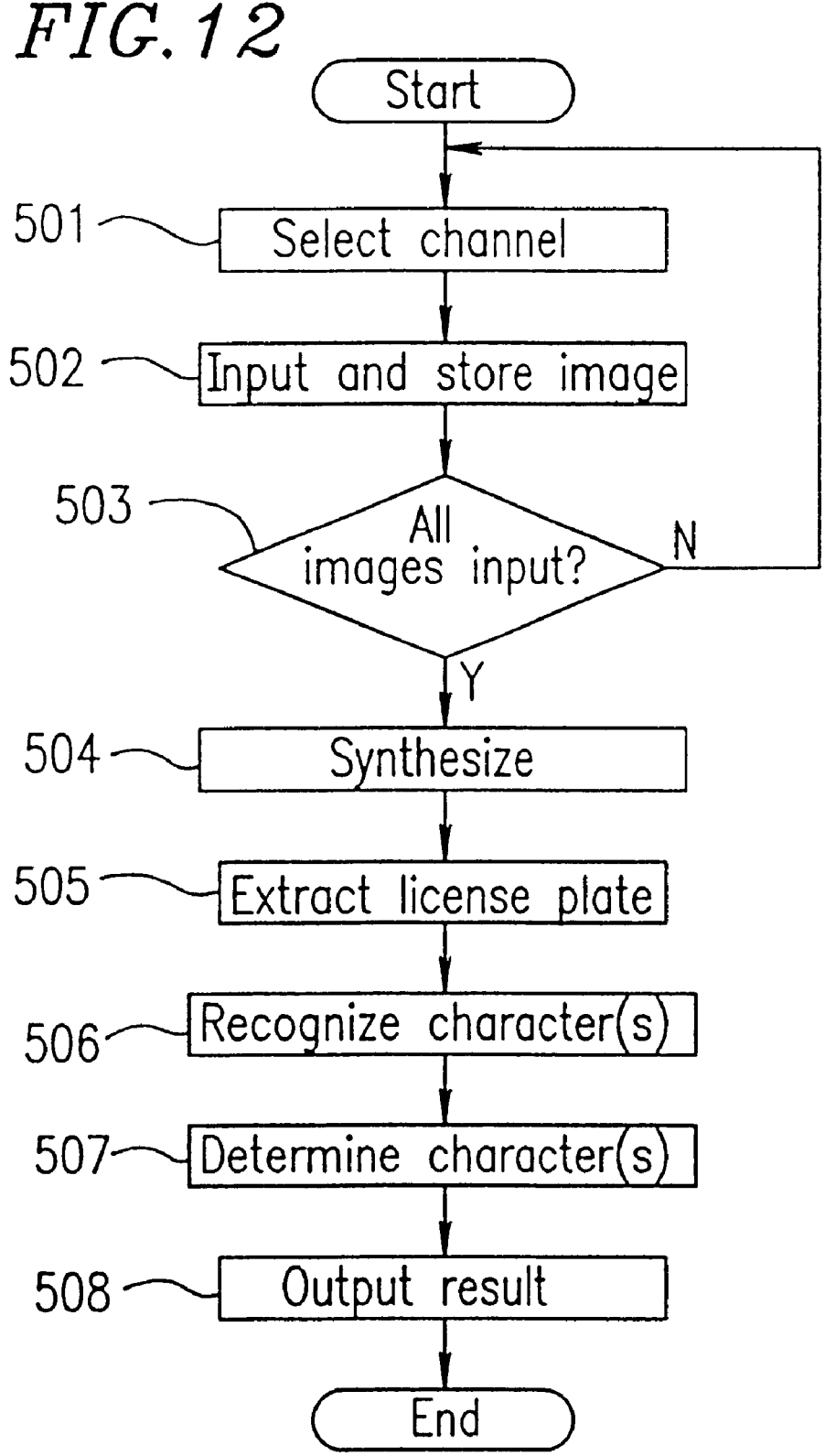
FIG. 12 is a flow chart illustrating another procedure conducted by the image processing apparatus of Example 2.

FIG. 12 is a flow chart showing another image processing procedure of the image processing apparatus according to Example 2.

In Step 501, one of the first and second CCDs 31 and 32, which has not been selected, is selected. For example, the first CCD 31 is selected. In Step 502, the image obtained by the selected CCD is provided to the image processing section 13. The image processing section 13 temporarily stores the received image in the image memory 14. In Step 503, whether or not both images of the first and second CCDs 31 and 32 have been input is determined. In the case where the both images have been input (Step 503, Yes), the process proceeds to Step 504. Otherwise (Step 503, No), the process returns to Step 501.

As described above, assuming that the first CCD 31 is selected in Step 501, the image obtained by the first CCD 31 is sent to the image processing section 13. The image processing section 13 temporarily stores the received image in the image memory 14 (Step 502). Since the image of the second CCD 32 has not been input (Step 503, No), the process returns to Step 501, and the second CCD 32 is selected in Step 501. Then, the process proceeds to Step 504 through Steps 502 and 503.

In Step 504, the images of the first and second CCDs 31 and 32 are synthesized into a large complete image which is smooth and seamless. In Step 505, the image of the license plate 16 is extracted from the large image, and the extracted image is provided to the character determining section 15.

In Steps 506 and 507, the character determining section 15 recognizes and determines a character(s) on the license plate 16. Then, the determined character(s) is displayed on, for example, a display device (not shown) in Step 508.

As in the latter image processing procedure, the image of the license plate 16 can alternatively be extracted from the large image resulting from synthesizing the images of the first and second CCDs 31 and 32, instead of extracting the image of the license plate 16 from each of the images of the first and second CCDs 31 and 32 as in the former image processing procedure.

(EXAMPLE 3)

Figure 13:
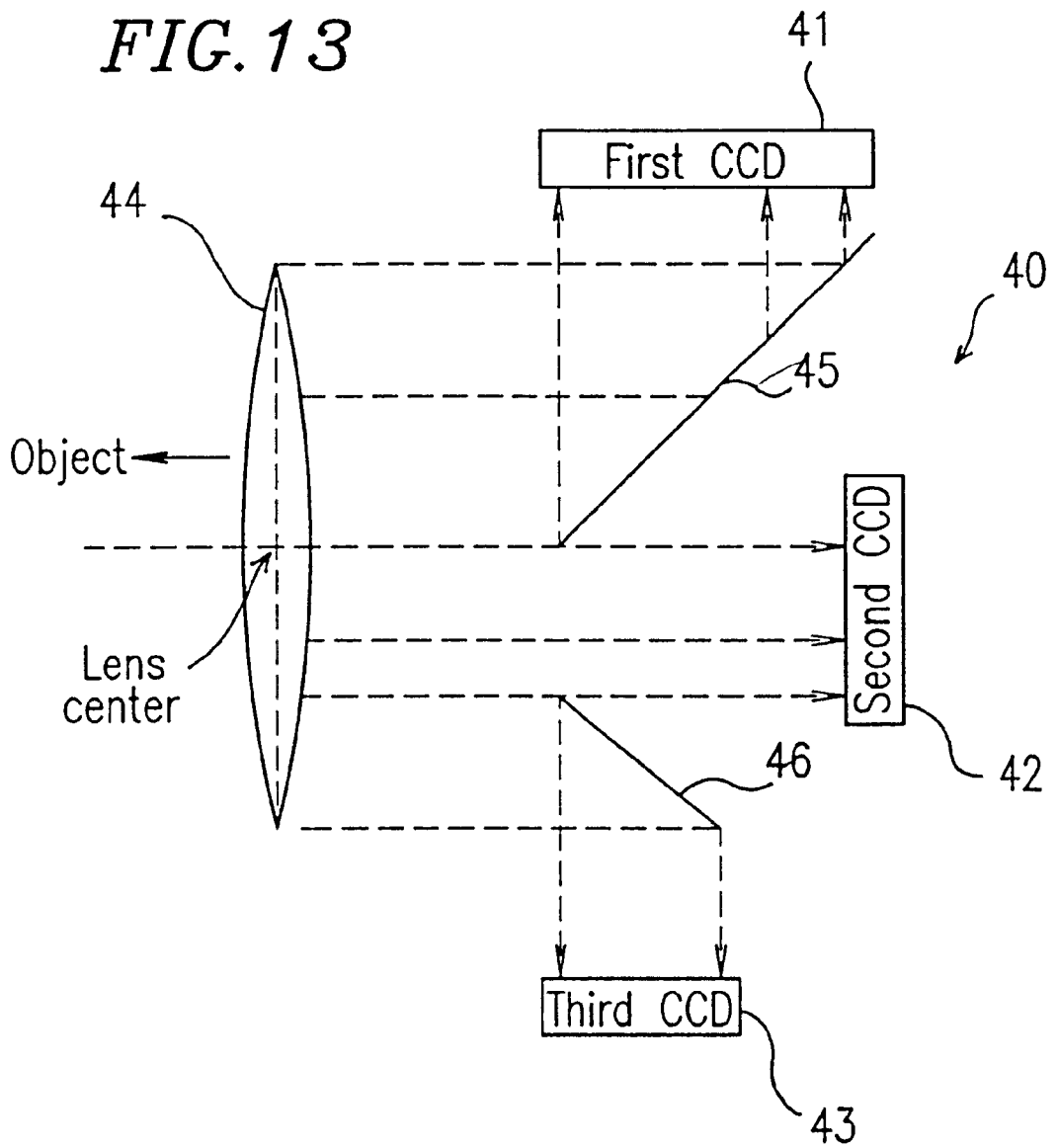
FIG. 13 is a block diagram of an imaging section of an image processing apparatus according to Example 3 of the present invention.

FIG. 13 shows an imaging section 40 of an image processing apparatus according to Example 3 of the present invention. The image processing apparatus of Example 3 uses the imaging section 40 instead of the imaging section 11 of the image processing apparatus in FIG. 1, and includes a distance sensor 18 located near the stop position of an automobile 17 as in the case of the image processing apparatus in FIG. 6. The structure of the image processing apparatus of Example 3 is the same as that of the image processing apparatus in FIG. 1 except for the imaging section 40 and the distance sensor 18.

The imaging section 40 includes a first CCD 41, a second CCD 42, a third CCD 43, an imaging lens 44, a first semi-transparent mirror 45 and a second semi-transparent mirror 46. Light having passed through the imaging lens 44 is directed to the first semi-transparent mirror 45, the second CCD 42 and the second semi-transparent mirror 46. The first semi-transparent mirror 45 reflects the received light into the first CCD 41, and the second semi-transparent mirror 46 reflects the received light into the third CCD 43. The positions of the first, second and third CCDs 41, 42 and 43 and the first and second semi-transparent mirrors 45 and 46 are adjusted in advance so that the images obtained by the first, second and third CCDs 41, 42 and 43 are in contact with each other at a single side.

Accordingly, the entire imaging range of the first, second and third CCDs 41, 42 and 43 is larger than that of the first and second CCDs 31 and 32 of the imaging section 30 in FIG. 9.

Figure 14:
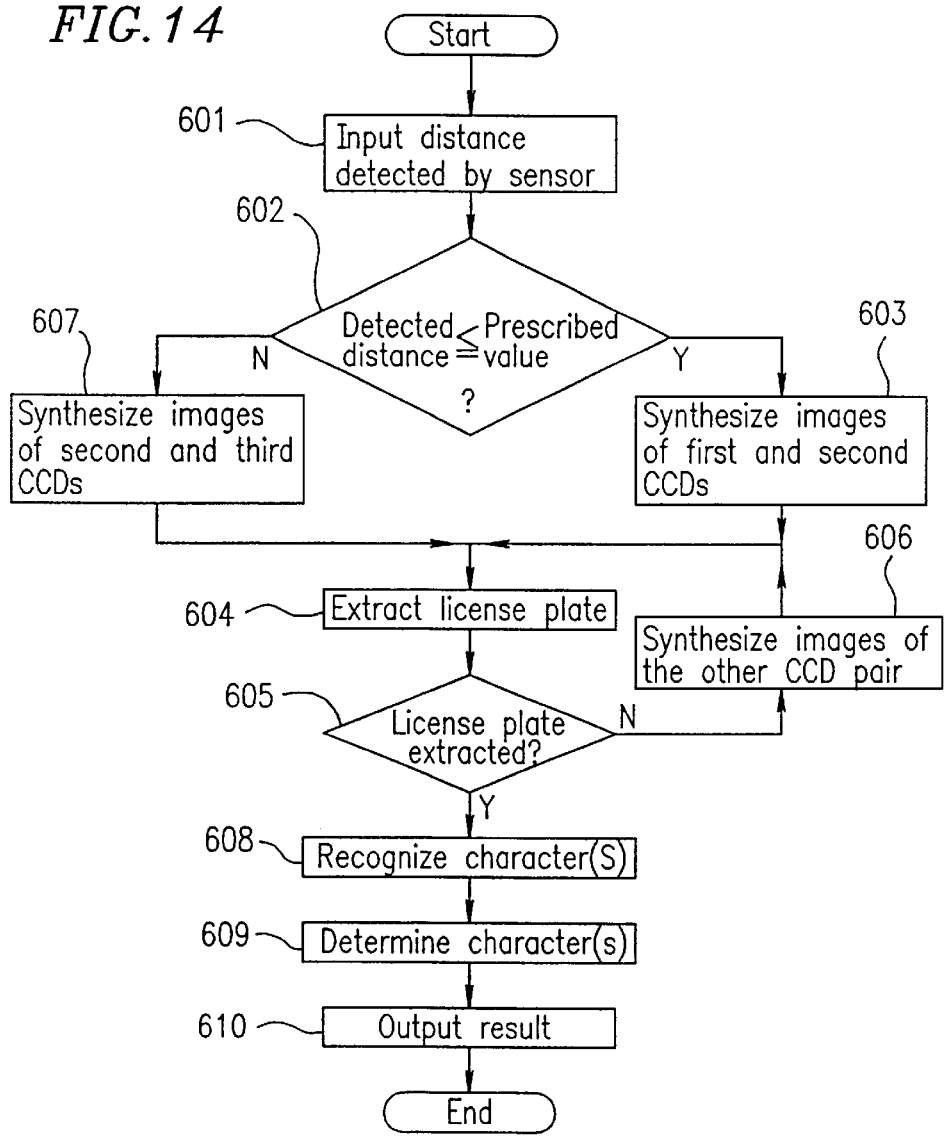
FIG. 14 is a flow chart illustrating a procedure conducted by the image processing apparatus of Example 3.
Figure 15:
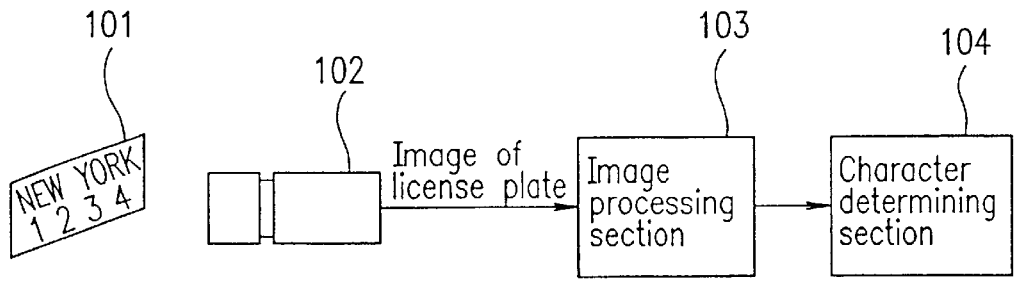
FIG. 15 is a block diagram of a conventional number recognition system.
Figure 16:
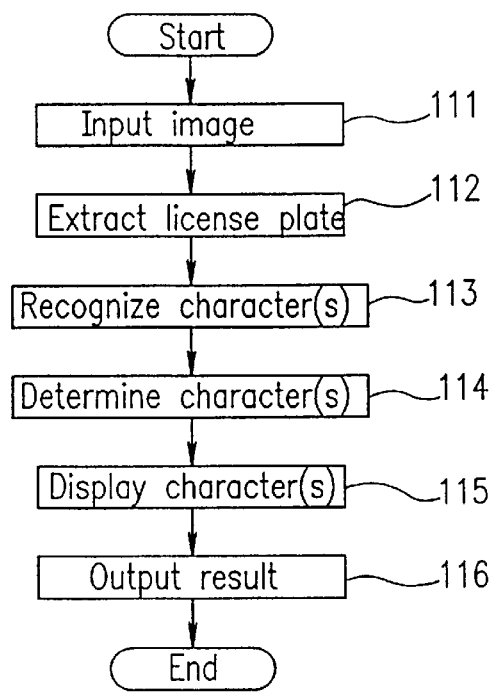
FIG. 16 is a flow chart illustrating a procedure conducted by the system shown in FIG. 15.

In the present example, these three CCDs have their respective imaging ranges. Therefore, the image of the license plate 16 is included in any one of the images of the three CCDs, or is divided into adjacent two images. Accordingly, the process according to the flow chart of FIG. 14 is conducted.

First, when the automobile 17 stops at a prescribed stop position, the distance sensor 18 detects the distance between the distance sensor 18 and the automobile 17, and provides the detected distance to the image selecting section 12 (Step 601). In the case where the distance between the automobile 17 and the distance sensor 18 is small, the license plate 16 of the automobile 17 is likely to be imaged by the first CCD 41 or the second CCD 42. In the case where the distance between the automobile 17 and the distance sensor 18 is large, the license plate 16 of the automobile 17 is likely to be imaged by the second CCD 42 or the third CCD 43. Accordingly, the image selecting section 12 selects-either the first and second CCDs 41 and 42 or the second and third CCDs 42 and 43, based on the detection signal of the distance sensor 18.

In Step 602, the image selecting section 12 compares the detected distance between the automobile 17 and the distance sensor 18 with a prescribed value.

In the case where the distance between the automobile 17 and the distance sensor 18 is equal to or smaller than the prescribed value, the process proceeds to Step 603. In Step 603, the first and second CCDs 41 and 42 are selected, and the respective image data of the first and second CCDs 41 and 42 is provided to the image processing section 13. The image processing section 13 synthesizes the images represented by the respective image data into a large complete image which is smooth and seamless.

In the case where the distance between the automobile 17 and the distance sensor 18 is larger than the prescribed value, the process proceeds to Step 607. In Step 607, the second and third CCDs 42 and 43 are selected, and the respective image data of the second and third CCDs 42 and 43 is provided to the image processing section 13. The image processing section 13 synthesizes the images represented by the respective image data into a large complete image which is smooth and seamless.

In Step 604, the image processing section 13 attempts to extract the image of the license plate 16 from the large image.

In the case where the image of the license plate 16 can be extracted (Step 605, Yes), the process proceeds to Step 608. Otherwise (Step 605, No), the process proceeds to Step 606.

In Step 606, the other CCD pair, that is, the first and second CCDs 41 and 42 or the second and third CCDs 42 and 43 are selected, and the respective image data of the selected CCD pair is provided to the image processing section 13. The image processing section 13 synthesizes the images represented by the respective image data into a large complete image which is smooth and seamless. Then, the process proceeds to Step 604.

When the image of the license plate 16 is extracted from the large image (Step 605, Yes), the extracted image of the license plate 16 is provided to the character determining section 15. The character determining section 15 recognizes and determines a character(s) on the license plate 16 in Steps 608 and 609. Then, the determined character(s) is displayed on, for example, a display device (not shown) in Step 610.

As described above, two of the first, second and third CCDs 41, 42 and 43 are selectively combined according to the detected distance between the distance sensor 18 and the automobile 17, and the images obtained by the two CCDs are synthesized into a single large image. Accordingly, the image of the license plate 16 is extracted with a higher probability.

Alternatively, as in the case of the flow chart of FIG. 12, the image processing apparatus of Example 3 can initially synthesize the images of the first, second and third CCDs 41, 42 and 43 into a single large image so as to extract the image of the license plate 16 therefrom.

It should be noted that the present invention is not limited to the examples described above, and various modifications can be made by those skilled in the art. For example, a plurality of CCDs may each have their own respective imaging lenses. In this case, each of the respective pairs of the CCDs and the imaging lenses may form a single unit, and each of the units is independently located with respect to the object (i.e., number plate). Alternatively, a multiplicity of CCDs may be provided. In this case, the object may be extracted from the synthesized image of the multiplicity of CCDs, or the position of the object may be specifically detected in order to select one or more CCDs which images the object from the multiplicity of CCDs, based on the detected position. Then, the object may be extracted from the image of the selected CCD or from the synthesized image of the selected CCDs.

As has been described above, the image processing apparatus according to the present invention includes imaging devices and an optical device(s) as a single unit, whereby the relative positions of the respective imaging ranges of the imaging devices are specified. Accordingly, the image processing apparatus can be easily installed without the need to adjust the respective imaging ranges of the imaging devices, thereby improving the reliability. Since the relative positions of the respective imaging ranges of the imaging devices are specified, the process conducted by the image processing section can be determined in advance, eliminating the need to adjust an image processing software. It should be understood that the a large imaging range can be assured by pre-setting the respective imaging ranges of the plurality of imaging devices as appropriate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus, comprising:
   a plurality of imaging devices located at respective prescribed positions each for imaging different portions of an image scene;
   at least one optical device for receiving light of the image scene and projecting respective portions of the received light to respective imaging devices;
   an image processing section for processing at least one of the image portions obtained by a respective one of the imaging devices, wherein the imaging devices and the at least one optical device form a single unit;
   wherein the image processing section synthesizes at least two of the respective image portions obtained by the imaging devices into a single image having no overlapping portion.

2. An image processing apparatus according to claim 1, wherein
   the optical device is a single element, and projects an entire image scene as respective portions thereof to respective ones of the plurality of imaging devices.

3. An image processing apparatus according to claim 1, further comprising:
   a semi-transparent mirror for dividing the light from the optical device into the plurality of portions to assign respective portions of the divided image scene to the respective imaging devices.

4. An image processing apparatus according to claim 1, further comprising:
   a detecting section for detecting a position of an object in the image scene, wherein the image processing section selects one of the respective image portions obtained by the imaging devices, based on the detected position of the object, and processes the selected image portion.

5. An image processing apparatus according to claim 4, wherein
   the image processing section extracts the object from the selected image portion.

6. An image apparatus according to claim 1, wherein
   the image processing section extracts the object from the single image resulting from synthesizing at least two of the respective image portions obtained by the imaging devices.

7. An image processing apparatus, comprising:
   a plurality of imaging devices, located at respective prescribed positions, the different positions being different positions each for imaging portions of an image scene;
   at least one optical device for receiving light of the image scene and projecting respective portions of the received light to respective imaging devices;
   a first semi-transparent mirror for dividing the image scene from the optical device into a plurality of slightly overlapping portions to assign respective portions of the divided scene to the respective imaging devices; and
   an image processing section for processing respective image portions of the image scene obtained by the imaging devices, wherein the imaging devices and the optical section form a single unit.

8. An image processing apparatus according to claim 1, wherein
   the optical device is a single element, and projects an entire image scene as respective portions thereof to respective ones of the plurality of imaging devices.

9. An image processing apparatus according to claim 7, further comprising
   a detecting section for detecting a position of an object in the image scene, wherein the image processing section selects one of the respective portions obtained by the imaging devices, based on the detected position of the object, and processes the selected image portion.

10. An image processing apparatus according to claim 9, wherein the image processing section extracts the object from the selected image portion.

11. An image processing apparatus according to claim 7, wherein
    the image processing section synthesizes at least two of the respective images obtained by the imaging devices into a single image having no overlapping portion.

12. An image processing apparatus according to claim 11, wherein
    the image processing section extracts the object from the single image resulting from synthesizing at least two of the respective image portions obtained by the imaging devices.

13. An image processing apparatus according to claim 1, wherein
    the semi-transparent mirror reflects a portion of the image scene to a first imaging device and allows another portion of the image scene to pass directly by to a second imaging device.

14. An image processing device according to claim 13, further including a third imaging device and a second semi-transparent mirror.

15. An image processing apparatus according to claim 1, further including a distance sensor operatively connected to an image selecting section for sensing the distance to an object in the image scene.

* * * * *